United States Patent [19]

Josefsson

[11] Patent Number: 5,425,670

[45] Date of Patent: Jun. 20, 1995

[54] SPRAY BOOTH OVERSPRAY REMOVAL ARRANGEMENT AND METHOD

[75] Inventor: Leif E. Josefsson, Sterling Heights, Mich.

[73] Assignee: ABB Flakt, Inc., Auburn Hills, Mich.

[21] Appl. No.: 192,502

[22] Filed: Feb. 7, 1994

Related U.S. Application Data

[63] Continuation-in-part of Ser. No. 919,918, Jul. 27, 1992, Pat. No. 5,380,243.

[51] Int. Cl.⁶ ............................................. B05B 15/12
[52] U.S. Cl. ....................................... 454/54; 55/242; 55/DIG. 46; 454/52
[58] Field of Search ....................... 454/50, 52, 53, 54; 118/326; 55/240, 241, 242, DIG. 46

[56] References Cited

U.S. PATENT DOCUMENTS

| | | |
|---|---|---|
| 2,719,705 | 10/1955 | Watson . |
| 3,168,030 | 2/1965 | Wilhelmsson et al. . |
| 3,170,384 | 2/1965 | Krantz et al. . |
| 3,421,293 | 1/1969 | Halls . |
| 3,561,135 | 2/1971 | Fulford . |
| 3,803,997 | 4/1974 | Van Raden . |
| 4,440,554 | 4/1984 | Perry . |
| 4,582,515 | 4/1986 | Eneroth et al. . |
| 4,735,637 | 4/1988 | Patte ................ 454/54 X |
| 4,783,257 | 11/1988 | Morioka et al. ........ 210/109 |
| 4,818,388 | 4/1989 | Morioka et al. ........ 210/167 |
| 4,895,100 | 1/1990 | Kraus et al. ........... 454/54 X |
| 4,951,600 | 8/1990 | Soshi et al. ............. 118/696 |

FOREIGN PATENT DOCUMENTS

| | | |
|---|---|---|
| 415511 | 3/1991 | European Pat. Off. ........ 454/52 |
| 2310161 | 12/1976 | France ..................... 118/326 |
| 3134248 | 3/1983 | Germany . |
| 123245 | 9/1979 | Japan ...................... 118/326 |
| 1080702 | 8/1967 | United Kingdom . |
| 1118425 | 10/1984 | U.S.S.R. ................. 118/326 |

*Primary Examiner*—Harold Joyce
*Attorney, Agent, or Firm*—Harness, Dickey & Pierce

[57] ABSTRACT

A method and apparatus for reducing the debris that enters the air inlet of a paint overspray scrubber includes at least an upper collection pond positioned above the air inlet. Lower collection ponds are placed beneath the upper collection pond in horizontally overlapping positions with the upper collection pond so that debris not settling in the upper collection pond will settle in the lower collection pond, providing coverage beneath an entire paint application zone. Debris settling in the collection ponds is removed by providing flush water to rinse the accumulated debris from the collection ponds for removal from the system. Such a system prevents clogging of the air inlet and accumulation of debris on flood sheets in an-air scrubber chamber.

40 Claims, 3 Drawing Sheets

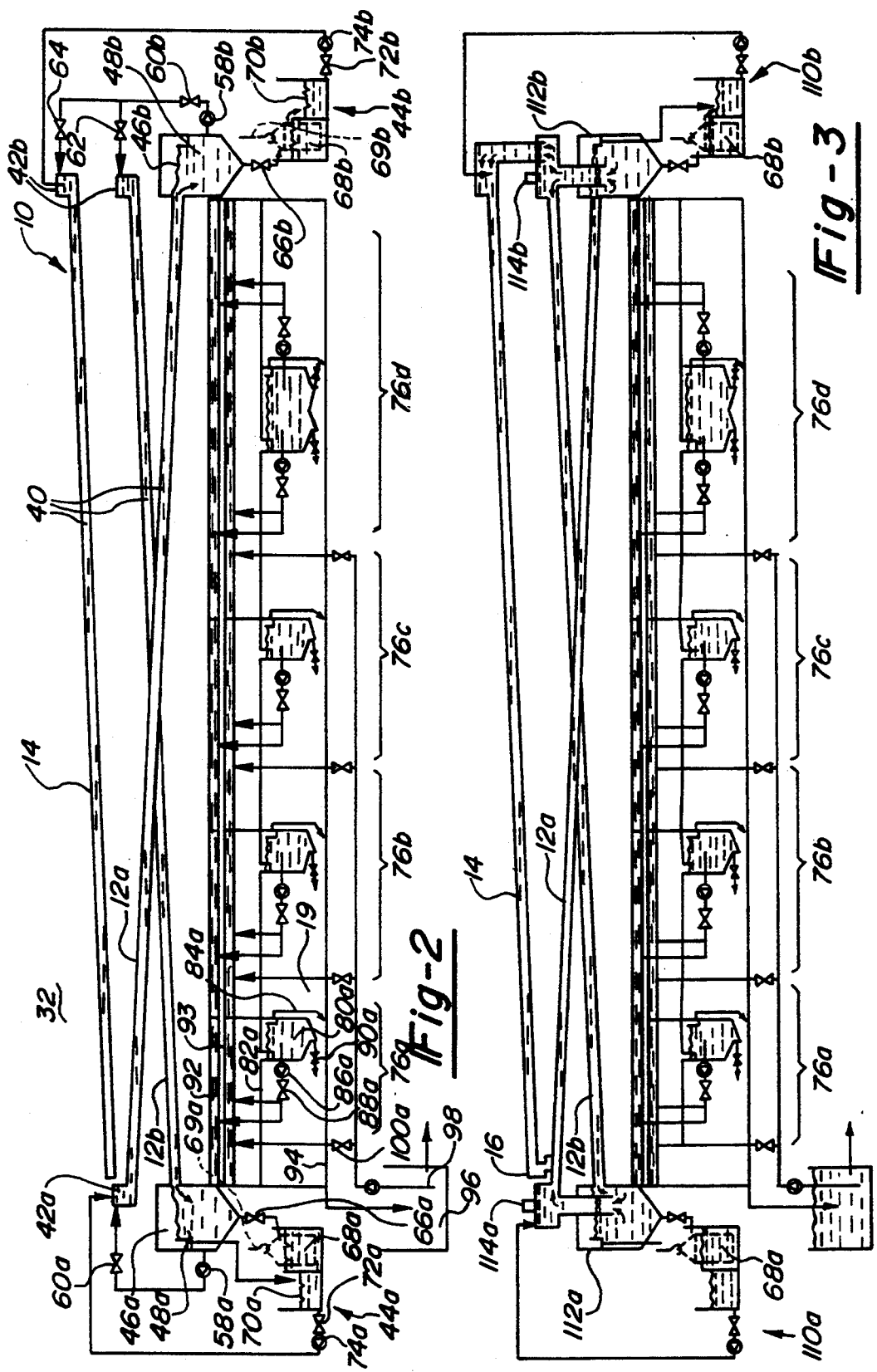

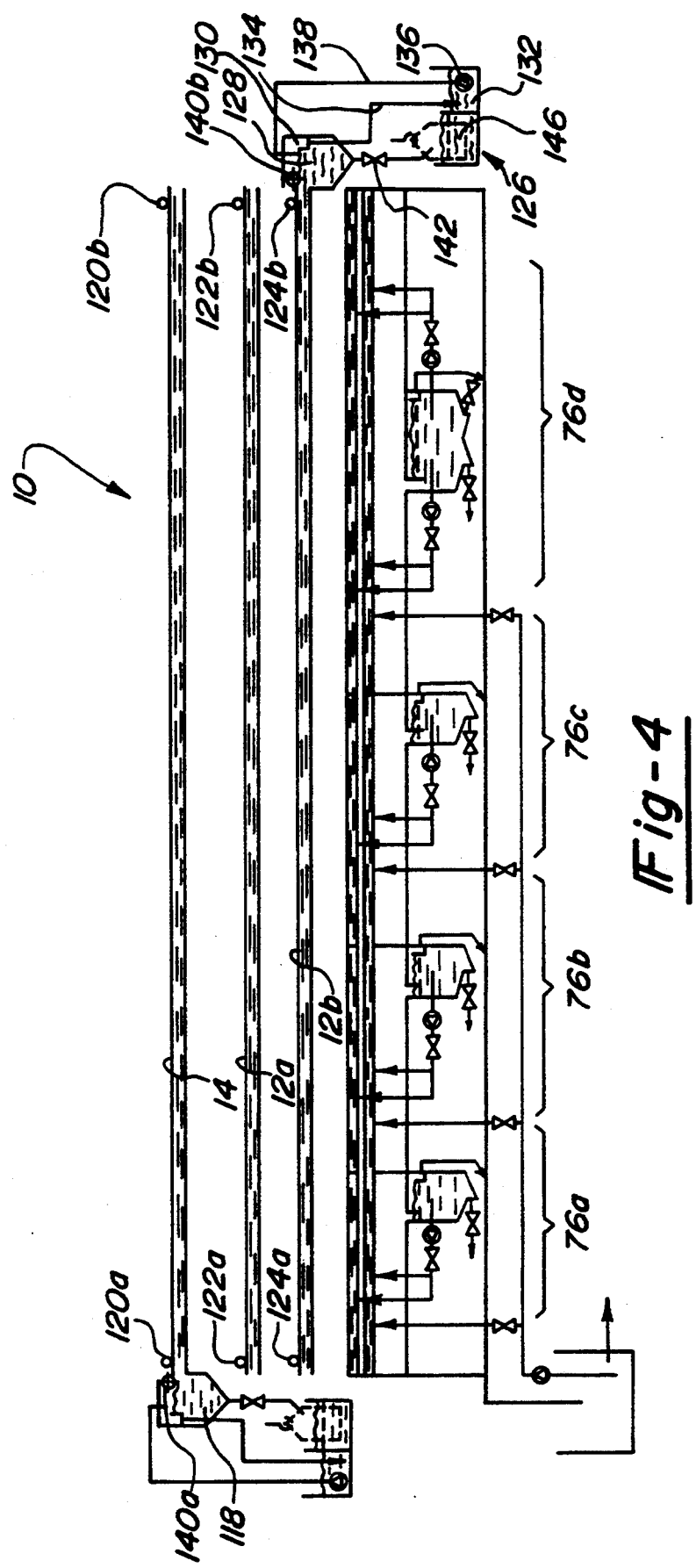

SPRAY BOOTH OVERSPRAY REMOVAL ARRANGEMENT AND METHOD

This application is a continuation-in-part of U.S. patent application Ser. No. 07/919,918, filed Jul. 27, 1992, U.S. Pat. No. 5,380,243 entitled Air Supply Housing Arrangement for Paint Spray Booths, and assigned to the same assignee as the present invention.

BACKGROUND OF THE INVENTION

In a traditional paint spray booth, residual paint spray, or overspray, is transported for scrubbing in an appropriate air scrubber arrangement. Such air scrubbers generally include paint overspray collection systems in which the overspray falls through a perforated floor of the paint spray booth and is funnelled through a venturi system. The venturi system accelerates the overspray air speed considerably to effectuate thorough mixing of overspray particles with scrubber water for eventual separation of paint particles and water from the overspray atmosphere in one of a number of methods.

More particularly, in a typical overspray scrubbing system, paint falls through a floor grating and onto flood sheets before entry into the scrubber system. However, some paint particles adhere to the floor grating although the majority of particles pass through the floor grating. Over time, these paint particles tend to adhere to each other and accumulate in icicle-like formations suspended beneath the floor grating. These accumulations of paint either fall off or are power washed from the floor grating. After being dislodged from the floor grating, the paint accumulations often proceed to either stick to the flood sheets and block the water feed to the scrubber venturi or move to the scrubber venturi where they create blockages. Furthermore, although a majority of the paint overspray particles passing through the floor grating funnel through the venturi, some larger paint overspray particles do not funnel through the venturi and fall onto the flood sheet instead. These denser particles also potentially accumulate and either adhere to the flood sheet or move to the scrubber venturi where they may inhibit water flow.

A number of paint application systems currently use water based paints in the spray booths. Such applications make it desirable to collect overspray scrubber water in an overspray collector in order remove paint from the overspray scrubber water. Such paint recovery systems require a relatively pure mixture of paint overspray and water and become less effective when dirt, dust, and other debris fall through the floor grating and onto the flood sheets where they are removed along with the overspray by the scrubber water. Accordingly, it is desirable to provide an air scrubber which collects overspray for separation of paint particles from air while preventing accumulated paint, dirt, dust, and other debris from contaminating the overspray air mixture.

SUMMARY OF THE INVENTION

This invention is directed to a method and apparatus for reducing the debris that enter the inlet of a paint overspray air scrubber. An upper collection pond is positioned above the air inlet, preventing a direct vertical path from the spray booth area of a paint station to the air inlet. Lower collection ponds are placed beneath the upper collection pond in partially horizontally overlapping positions with the upper collection pond so that debris not settling in the upper collection pond will settle in a lower collection pond. Debris settling in the collection ponds is removed by providing flush water to rinse the accumulated debris from the collection ponds for later removal from the system. In one aspect of the invention, the collection ponds are pitched to facilitate flush water flow and removal of debris.

In another aspect of the invention, the flush water which removes the accumulated debris from the collection ponds is recirculated. Flush water flows into recirculation tanks in which debris removed from the collection ponds settle, and the flush water is then pumped or agitated back to the collection ponds. The recirculation tanks are periodically drained to remove the debris flushed from the collection ponds and settling in the recirculation tanks.

In a further aspect of the invention, the collection ponds are substantially horizontal, and collected debris is removed from the collection ponds using one or a number of scrapers. The scrapers traverse the collection ponds and sweep flush water and debris toward the recirculation tanks. Flush water swept into the recirculation tank may also be recirculated.

From the subsequent detailed description taken in conjunction with the accompanying drawings and subjoined claims, other objects and advantages of the present invention will become apparent to those skilled in the art.

BRIEF OF THE DRAWINGS

FIG. 2 is a partial cross-sectional side view of paint overspray removal apparatus arranged in accordance with the principles of the invention showing collection ponds and a recirculation system;

Figure 1:
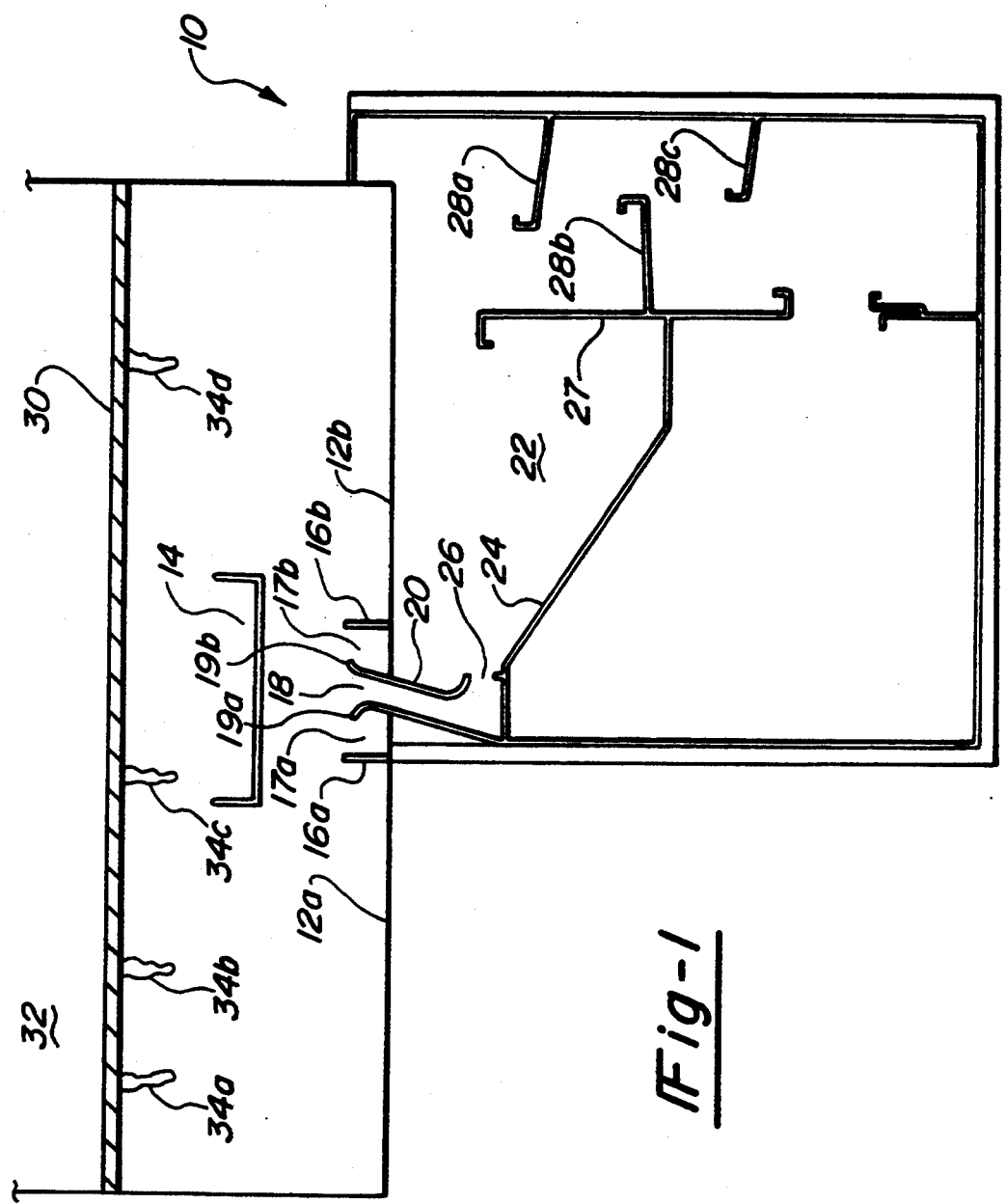
FIG. 1 is a partial cross-sectional front view of an overspray removal apparatus embodying the present invention.

FIG. 3 is a partial cross-sectional side view of overspray apparatus of the invention showing the collection ponds and a recirculation system having agitators for recirculating pond flush water; and FIG. 4 is a partial cross-sectional side view of overspray removal apparatus arranged according to this invention having scraper blades for removing accumulated paint and other debris from the collection ponds.

DETAILED DESCRIPTION OF THE PREFERRED EMBODIMENTS

Referring now to FIG. 1, the overspray removal apparatus 10 is arranged in accordance with the principles of this invention. Overspray removal apparatus 10 includes lower collection ponds 12a and 12b and upper collection pond 14. Lower collection ponds 12a-b include side walls 16a and 16b which define the medial edges of collection ponds 12a-b and are arranged to partially horizontally overlap upper collection pond 14. A venturi 20 includes venturi inlet 18 and venturi opening 26. Venturi opening 26 opens to overspray scrubber chamber 22, many of which are known in the art. The overspray expansion chamber 22 depicted in FIG. 1 also includes a flood sheet 24. Side walls 16a and 16b also define troughs 17a and 17b, respectively, which hold scrubber water (not shown). Scrubber water in troughs 17a and 17b overflows the flared ends 19a and 19b, respectively, of venturi inlet 18. Venturi 20 substantially increases the speed of the paint overspray and the scrubber water as the paint overspray and scrubber water pass through venturi 20 and venturi opening 26. Upon exit from venturi opening 26, scrubber water and overspray air are accelerated, resulting in the breakdown of scrubber water into water droplets (not shown). Because the overspray air is accelerated to a greater speed than the scrubber water droplets, airborne paint overspray particles collide with the scrubber water droplets and are removed from the overspray air as the air enters scrubber chamber 22. In scrubber chamber 22, scrubber water droplets fall upon flood sheet 24 and generally settle to the bottom of scrubber chamber 22 while the scrubbed overspray air reflects off rebound wall 27. Scrubber water, including removed paint overspray particles, settles at the bottom of scrubber chamber 22 where it may be removed as described with respect to FIGS. 2-4. Overspray scrubber chamber 22 also includes baffles 28a-c for removing additional water particles from the air flowing through the overspray scrubber.

Also shown in FIG. 1 is floor grating 30 over which the paint application operation generally occurs in paint application zone 32 of spray booth 1. As paint particles fall through floor grating 30 from paint application zone 32, some of the paint particles in the overspray will adhere to floor grating 30, forming any number of overspray paint buildups 34a-d. In a typical overspray system, overspray paint buildups 34a-d would either be washed away or removed using any of a number of processes known in the art and would fall directly onto an underlying flood sheet. Furthermore, larger airborne paint overspray particles may not always migrate to venturi inlet 18 and similarly may settle on an underlying flood sheet, rather than passing through venturi inlet 18 where they are mixed with scrubber water for collection. In the apparatus of the present invention, because the collection ponds 12a, 12b, and 14 are arranged in a horizontally overlapping arrangement and span the entirety of the area beneath paint application zone 32, the collection ponds 12a, 12b, and 14 prevent any direct vertical path to overspray collection opening 18 and provide an area for such debris to settle. Thus, when paint accumulations 34a-d or any other debris such as larger overspray particles, dirt, or dust fall from or through floor grating 30, the accumulated paint, dirt, and other debris fall into one of collection ponds 12a, 12b, or 14, rather than into the scrubber water supply and venturi opening of the air scrubber. Flush water removes the paint accumulations and other debris from collection ponds 12a, 12b, and 14, to be described in further detail with respect to FIGS. 2-4. It should be noted that the flush water removing paint accumulations and other debris is separate and distinct from scrubber water which overflows troughs 17a and 17b into venturi inlet 18 for mixing with overspray paint particles to carry out collection of the overspray paint particles. Separation of the collection pond flush water and scrubber water systems provides for more efficient scrubbing, as the venturi 20 remains free of paint accumulations and other debris which inhibit air and water flow through the venturi and inhibit efficient mixing of paint overspray particles and scrubber water. Moreover, the collection pond flush water flow rate exceeds the scrubber water flow rate, which is set in accordance with efficient scrubbing, providing greater force for more effectively removing paint accumulations and other debris falling onto collection ponds 12a, 12b, and 14.

Referring to FIG. 2, collection ponds 12a, 12b, and 14 and other elements of FIG. 1 extend for substantially the entire length of paint application zone 32 as shown. Because paint accumulations, larger overspray particles, dirt, and other debris fall into collection ponds 12a, 12b, and 14, it is necessary to periodically or continuously desludge these collection ponds. Collection ponds 12a, 12b, and 14 are pitched longitudinally along the length of paint application zone 32 so that flush water 40 flows down the pitch at a sufficient speed to develop the force necessary to remove the accumulated debris. Flush water head buildups 42a-b receive flush water from flush water recirculation systems 44a-b, respectively. The flush water head buildups 42a-b are sufficiently high enough to facilitate imparting the desired velocity to the flush water for travel down collection ponds 12a, 12b, and 14. Flush water from collection ponds 12a and 12b flows into recirculation tanks 46b and 46a, respectively, of flush water recirculation systems 44a and 44b. Flush water from collection pond 14 spills into head buildup 42a or, alternatively, may flow into recirculation tank 46a. The recirculation tanks 46a-b include overflow weirs 48a-b which are receptive to relatively clean flush water near the top of recirculation tanks 46a and 48a, respectively. In flush water recirculation system 44a, with pump 58a activated and valve 60a open, flush water recirculates from recirculation tank 46a to head buildup 42a and down collection pond 12a. Similarly, in recirculation system 44b, with pump 58b activated and valves 62 and 64 open, flush water recirculates from recirculation tank 46b into flush water head buildups 42b and down collection ponds 12b and 14, respectively.

Periodically, recirculation tanks 46a-b must be drained in order to remove sludge and debris flushed from collection ponds 12a, 12b, and 14. To flush recirculation tanks 46a-b of this sludge, valves 66a-b are opened allowing sludge to flow through filter baskets 68a-b which are hung from hangers 69a-b, respectively. Filtered water flows through filter baskets 68a-b and into flush water reservoirs 70a-b, respectively. With valves 72a-b open and pumps 74a-b activated, water from flush water reservoirs 70a-b recirculates.

In spray booth zones 76a-d, scrubber water is recycled and air is recycled or exhausted. An example of this system is more fully described in application Ser. No. 07/919,918, U.S. Pat. No. 5,380,243 entitled Air Supply Housing Arrangement for Paint Spray Booths, assigned to the assignee of the present application. It should be noted initially that the recirculation system for flush water is separate and distinct from the recirculation system for scrubber water. The flush water recirculation system 44a-b removes dirt and debris from collection ponds 12a, 12b and 14. The scrubber water recirculation system as shown in spray booth zones 76a-d removes and recovers scrubber water which separates overspray paint particles from booth air. The advantages of separation have been described above with respect to FIG. 1.

Operation for one of the zones, spray booth zone 76a, will be described herein and is exemplary for spray booth zones 76b-d as well. Flood sheets 82a drain scrubber water into water recirculation tank 80a. Pipe 84a bleeds off water from water recirculation tank 80a. With pump 86a activated and valve 88a open, water flows from water recirculation tank 80a to troughs 92 and 93. Troughs 92 and 93 may correspond to troughs 17a and 17b of FIG. 1. Scrubber water overflowing troughs 92 and 93 mixes with paint overspray particles in a venturi (not shown) and falls onto flood sheet 82a from which it collects in recirculation tank 80a. In order to drain water recirculation tank 80a, valve 90a is opened, thereby enabling sludge consisting primarily of paint particles recovered from paint overspray to flow from the bottom of flood water recirculation tank 80a through pipe 94 and into sludge cart 96. The desludged water is recirculated to trough 93, for example, through pipe 98 upon opening valve 100a.

Referring to FIG. 3, the apparatus as described in FIGS. 1 and 2 is depicted with the modification that the flush water recirculation systems 44a and 44b of FIG. 2 are depicted as flush water recirculation systems 110a and 110b, respectively, and include agitators 114a and 114b for recirculating flush water to collection ponds 12a, 12b, and 14. Note that like elements throughout the drawings described herein are identified with like reference numerals. In this arrangement, flush water from collection ponds 12a and 12b flows into recirculation tanks 112b and 112a, respectively, and flush water from collection pond 14 flows through pipe 116 onto collection pond 12a.

Agitators 114a and 114b lift flush water from recirculation tanks 112a and 112b, respectively. In flush water recirculation system 110a, agitator 114a lifts flush water to collection pond 12a for flushing collection pond 12a. In flush water recirculation system 110b, agitator 114b lifts water from recirculation tank 112b to collection ponds 12b and 14. Note that the filter baskets 68a and 68b and the elements related thereto for removal of settled material from recirculation tanks 112a and 112b function as described with respect to FIG. 2. Also note that spray booth zones 76a-76d and the elements related thereto function as described with respect to FIG. 2.

Referring to FIG. 4, an overspray removal apparatus 10 is disclosed where the collection ponds are substantially horizontal. Removal of debris from collection ponds 12a, 12b, and 14 occurs by means of scraper blade pairs 122a-b, 124a-b, and 120a-b, respectively. Flush water recirculation system 126 includes a flush water recirculation tank 128 into which flows flush water from collection pond 12b. Flush water recirculation tank 128 includes an overflow weir which bleeds off relatively clean flush water from recirculation tank 128 through pipe 134 into flush water reservoir 132. Pond water then recirculates from pond water reservoir 132 to flush water recirculation tank 128 via pump 136 and pipe 138. Scraper blades 124a and 124b are moved across collection pond 12b via a conveyor apparatus 140a and 140b, respectively, which generally includes cables or chains (not shown) guided by pulleys (not shown) attached to the scrapers 124a-b and may be guided using wheels extending into grooves (not shown) formed in collection pond 12b. The scrapers 124a-b move across collection pond 12b to scrape away larger overspray paint particles, accumulated paint, dirt, and other debris into flush water recirculation tank 128. Note that the number of scrapers 124a-124b may vary in accordance with the particular application. Scrapers 120a-b and 122a-b similarly remove larger paint overspray particles, accumulated paint, dirt, and other debris from upper collection pond 14 and lower collection pond 12a, respectively, into recirculation tanks 118 and 128, respectively, as described above with respect to collection pond 12b. An additional recirculation tank (not shown) for receiving accumulations removed by 122a-b of collection pond 12a may optionally be located at one end of the collection ponds and operates as described above.

As with respect to FIGS. 2 and 3, it is necessary to empty the dirt and debris which accumulate in flush water recirculation tank 128. Accumulated paint, dirt and other debris flow into filter basket 146 when valve 142 is opened, and the dirt and debris are filtered out. The filtered water then overflows into flush water reservoir 132 and back to recirculation tank 128 via pump 136. It should be noted that pond water recirculation system 126 is replicated for each of the recirculation tanks. Note that spray booth zones 76a-d and elements related thereto are as described with respect to FIG. 2. Note also that the scraper blades described with respect to FIG. 4 may also optionally be implemented in the systems described with respect to FIGS. 2-3 to further facilitate removal of material from collection ponds 12a, 12b, and 14.

While the above detailed description describes the preferred embodiment of the present invention, it will be understood that the present invention is susceptible to modification, variation and alteration without deviating from the scope and fair meaning of the subjoined claims.

What is claimed is:

1. In a paint spray booth including a paint application zone and an overspray air scrubber, said overspray air scrubber having an inlet disposed beneath the application zone for removing paint overspray from spray booth air, an apparatus for reducing debris entering the overspray air scrubber inlet, comprising particle collection means positioned between the application zone and the air scrubber such that particulate matter cannot fall substantially vertically into the overspray air scrubber inlet.

2. The apparatus as defined in claim 1 wherein the particle collection means comprises:
   at least one collection pond positioned to intercept a vertical path between the paint application zone and the air scrubber inlet for accumulating debris from said paint application zone.

3. The apparatus as defined in claim 2 wherein the paint spray booth includes a means for flushing accumulated debris, and the collection pond is vertically pitched, defining a high and a low end of said collection pond, the means for flushing providing flush liquid for sweeping accumulated debris from the high end toward the low end.

4. The apparatus as defined in claim 2 further comprising pond flush means for removing the accumulated debris from the collection pond.

5. The apparatus as defined in claim 4 further comprising at least one recirculation means for receiving pond-flush water from the collection pond and for recirculating the received pond flush water for flushing the collection pond.

6. The apparatus as defined in claim 5 wherein said recirculation means further comprises a recirculation tank receiving pond flush water and debris from the collection pond, the debris settling in the recirculation tank, the recirculation tank having a pond flush water return means for returning received pond flush water from the recirculation tank back to said collection pond.

7. The apparatus as defined in claim 6 wherein said recirculation means further comprises:
   an overflow weir in said recirculation tank for draining water overflowing from said recirculation tank to a pond flush reservoir; and desludging means for said recirculation tank including a means for removing said settled debris and collected pond flush water into a filter, said filter removing said debris and passing filtered pond flush water into said pond flush reservoir.

8. The apparatus as defined in claim 6 wherein the pond flush water return means further comprises an agitator for returning received pond flush water from the recirculation tank back to said collection pond.

9. The apparatus as defined in claim 3 further-comprising a head buildup at the high end of said collection pond for imparting a predetermined velocity to said pond flush water in accordance with a height of said head buildup.

10. The apparatus as defined in claim 2 further comprising at least one scraper blade traversing the collection pond in order to remove the debris from the collection pond.

11. The apparatus as defined in claim 10 further comprising a conveyor arrangement for moving the at least one scraper blade across the collection pond.

12. The apparatus as defined in claim 10 further comprising at least one recirculation means for receiving pond flush water from the collection pond and for recirculating the received water for flushing the collection pond.

13. The apparatus as defined in claim 12 wherein said recirculation means further comprises a recirculation tank receiving pond flush water and debris from the collection pond, the debris settling in the recirculation tank, the recirculation tank having a pond flush water return means for returning received pond flush water from the recirculation tank back to said collection pond.

14. The apparatus as defined in claim 13 wherein said recirculation means further comprises:
an overflow weir in said recirculation tank for draining water overflowing from said recirculation tank to a pond flush reservoir; and
desludging means for said recirculation tank including a means for removing said settled debris and flush water into a filter, said filter removing said debris and passing filtered pond flush water into said pond flush reservoir.

15. The apparatus as defined in claim 1 further comprising:
at least one upper collection pond positioned in a vertical path between the paint application zone and the air scrubber inlet for accumulating debris from the paint application zone; and
at least one lower collection pond partially horizontally overlapping the at least one upper collection pond for accumulating debris other than that collected by the at least one upper collection pond.

16. The apparatus as defined in claim 15 wherein the paint spray booth includes a means for flushing accumulated debris and the collection ponds are vertically pitched, defining a high and a low end of each of said upper and lower collection ponds the means for flushing providing flush liquid for sweeping accumulated debris from the high end to the low end.

17. The apparatus as defined in claim 16 further comprising pond flush means for removing the accumulated debris from the collection ponds.

18. The apparatus as defined in claim 17 further comprising at least one recirculation means for receiving pond flush water from the collection ponds and for recirculating the received pond flush water for flushing the collection ponds.

19. The apparatus as defined in claim 18 wherein said recirculation means further comprises a recirculation tank receiving pond flush water and debris from the collection ponds, the debris settling in the recirculation tank, the recirculation tank having a pond flush water return means for returning received pond flush water from the recirculation tank back to said collection ponds.

20. The apparatus as defined in claim 19 wherein said recirculation means further comprises:
an overflow weir in said recirculation tank for draining water overflowing from said recirculation tank to the pond flush reservoir; and
desludging means for said recirculation tank including a means for removing said settled debris and collected pond flush water into a filter, said filter removing said debris and passing filtered pond flush water into said pond flush reservoir.

21. The apparatus as defined in claim 16 further comprising a head buildup at the high end of said collection ponds for imparting predetermined velocity to said pond flush water in accordance with a height of said head buildup.

22. The apparatus as defined in claim 16 wherein the pond flush water return means further comprises an agitator for returning received pond flush water from the recirculation tank back to said collection ponds.

23. The apparatus as defined in claim 15 further comprising at least one scraper blade per collection pond, the scraper blade traversing the collection pond in order to remove the debris from the collection pond.

24. The apparatus as defined in claim 23 further comprising a conveyor arrangement for moving the at least one scraper blade across the collection ponds.

25. The apparatus as defined in claim 23 further comprising at least one recirculation means for receiving pond flush water from the collection ponds and for recirculating the received water for flushing the collection ponds.

26. The apparatus as defined in claim 25 wherein said recirculation means further comprises a recirculation tank receiving pond flush water and debris from the collection ponds, the debris settling in the recirculation tank, the recirculation tank having a pond flush water return means for returning received pond flush water from the recirculation tank back to said collection ponds.

27. The apparatus as defined in claim 26 wherein said recirculation means further comprises:
an overflow weir in said recirculation tank for draining water overflowing from said recirculation tank to the pond flush reservoir; and
desludging means for said recirculation tank including a means for removing said settled debris and flush water into a filter, said filter removing said debris and passing filtered pond flush water into said pond flush reservoir.

28. In a paint spray booth including a paint application zone and an overspray air scrubber, said overspray air scrubber having an inlet disposed beneath the paint application zone for removing paint overspray from spray booth air, an apparatus for reducing debris entering the overspray air scrubber inlet, comprising:
at least one upper collection pond positioned in a vertical path between the paint application zone and the air scrubber inlet for accumulating debris from said paint station, the upper collection pond being pitched, defining a high and a low end, to facilitate flushing accumulated debris;

at least one lower collection pond partially horizontally overlapping the at least one upper collection pond for accumulating debris other than that collected by the at least one upper collection pond, the lower collection pond being pitched, defining a high and a low end, to facilitate flushing accumulated debris, said at least one upper and lower collection ponds in combination being disposed beneath the entirety of the paint application zone;

pond flush means for removing the accumulated debris from the collection ponds; and at least one recirculation means for receiving pond flush water from the collection ponds and for returning the received pond flush water for flushing the collection ponds.

29. The apparatus as defined in claim 28 wherein said recirculation means further comprises a recirculation tank receiving pond flush water and debris from the collection ponds, the debris settling in the recirculation tank, the recirculation tank having a pond flush water return means for returning received pond flush water from the recirculation tank back to said collection ponds.

30. The apparatus as defined in claim 29 further comprising:

an overflow weir in said recirculation tank for draining water overflowing from said recirculation tank to a pond flush reservoir; and desludging means for said recirculation tank including a means for removing said settled debris and collected pond flush water into a filter, said filter removing said debris and passing filtered pond flush water into said pond flush reservoir.

31. The apparatus as defined in claim 29 wherein the pond flush water return means further comprises an agitator for returning collected pond flush water from the recirculation tank back to said collection ponds.

32. The apparatus as defined in claim 28 further comprising a head buildup at a high end of said collection ponds for imparting a predetermined velocity to said pond flush water in accordance with a height of said head buildup.

33. In a paint spray booth including a paint application zone and an overspray air scrubber, said overspray air scrubber having an inlet disposed beneath the paint station for removing overspray from spray booth air, an apparatus for reducing debris entering the overspray air scrubber inlet, comprising:

at least one upper collection pond positioned in a vertical path between the paint station and the air scrubber inlet for accumulating debris from said paint station;

at least one scraper blade associated with each of said at least one upper collection pond, the scraper blade traversing the collection pond in order to remove the debris from the collection pond;

at least one lower collection pond partially horizontally overlapping the at least one upper collection pond for accumulating debris other than those collected by the at least one upper collection pond, said at least one upper and lower collection ponds in combination being disposed beneath the entirety of the paint application zone;

at least one scraper blade associated with each of said at least one lower collection pond, the scraper blade traversing the collection pond in order to remove the debris from the collection pond;

pond flush means for removing the accumulated debris from the collection ponds; and at least one recirculation means for receiving pond flush water from the collection ponds and for returning the received water for flushing the collection ponds.

34. The apparatus as defined in claim 33 further comprising a conveyor arrangement for moving the scraper blades across the collection ponds.

35. The apparatus as defined in claim 33 wherein said recirculation means further comprises a recirculation tank receiving pond flush water and debris from the collection ponds, the debris settling in the recirculation tank, the recirculation tank having a pond flush water return means for returning received pond flush water from the recirculation tank back to said collection ponds.

36. The apparatus as defined in claim 35 further comprising:

an overflow weir in said recirculation tank for draining water overflowing from said recirculation tank to a pond flush reservoir; and desludging means for said recirculation tank including a means for removing said settled debris and flush water into a filter, said filter removing said debris and passing filtered pond flush water into said pond flush reservoir.

37. In a paint spray booth including a paint station and an overspray air scrubber, said overspray air scrubber having an inlet disposed beneath the paint station for removing the overspray air, a method for reducing debris entering the overspray air inlet, the method comprising positioning particle collection means between the application zone and the air scrubber such that particulate matter cannot fall substantially vertically into the overspray air scrubber inlet thereby substantially reducing the debris entering the inlet.

38. The method as described in claim 37 wherein the step of positioning particle collection means further comprises:

positioning at least one upper collection pond in a vertical path between the paint station and the air inlet for accumulating debris from said paint station;

positioning at least one lower collection pond to partially vertically overlap the at least one upper collection pond for accumulating debris other than those collected by the at least one upper collection pond; and flushing said ponds to removing the accumulated debris therefrom.

39. The method as defined in claim 38 further comprising receiving pond flush water from the collection ponds and recirculating the received pond flush water for flushing the collection ponds.

40. The method as defined in claim 39 wherein said step of recirculating collection pond flush water further comprises:

providing a recirculation tank for receiving pond flush water and debris from the collection ponds, the debris settling in the recirculation tank, the recirculation tank having a pond flush water return means for returning receiving pond flush water from the recirculation tank back to said collection ponds;

draining overflow pond flush water from said recirculation tank into said pond flush reservoir using an overflow weir; and desludging said recirculation tank by removing said settled debris and collected pond flush water into a filter, said filter removing said debris and passing filtered pond flush water into said pond flush reservoir.

* * * * *